Sept. 27, 1966 P. G. NEUMANN 3,275,992
LOAD SHARING CLOCK SUPPLIES
Filed Dec. 4, 1962 2 Sheets-Sheet 1
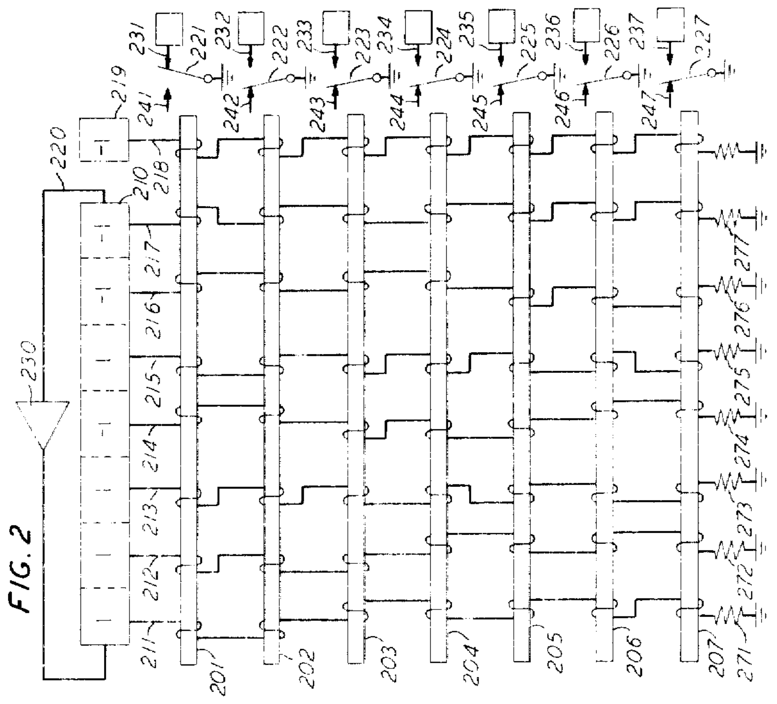
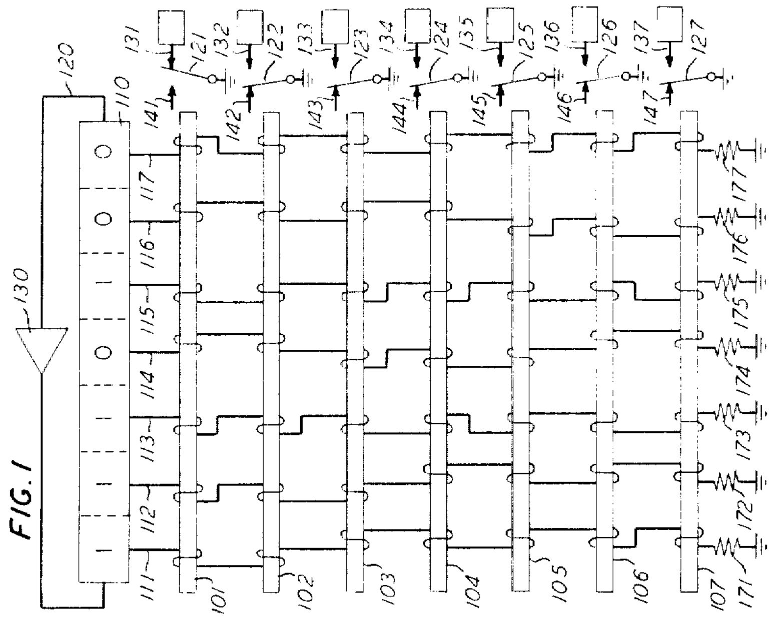
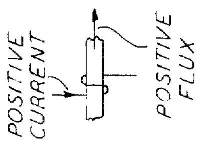
INVENTOR
P. G. NEUMANN
BY R. O. Nimz
ATTORNEY Sept. 27, 1966 P. G. NEUMANN 3,275,992

LOAD SHARING CLOCK SUPPLIES

Filed Dec. 4, 1962 2 Sheets-Sheet 2

3,275,992

LOAD SHARING CLOCK SUPPLIES

Peter G. Neumann, Berkeley Heights, N.J., assignor to Bell Telephone Laboratories, Incorporated, New York, N.Y., a corporation of New York Filed Dec. 4, 1962, Ser. No. 242,199

15 Claims. (Cl. 340—172.5)

This invention relates to multiphase clock supplies and, more particularly, to multiphase clock supplies utilizing load-sharing matrix switches.

In many information processing circuits, because of the inherent nature of the electronic components used, time delays occur in the flow of information. A clocking pulse timed to control one function of the processing circuit can not be used to control a related function in some different sequence of the circuitry, because of the time delays in the flow of information. One method of compensating for these time delays is to insert time delay devices in the clocking pulse circuit to time the application of the clocking pulse to correspond to the flow of information. This method creates collateral problems, however; for instance, a time delay device such as a delay line would tend to attenuate the clocking pulse and hence require the addition of power-consuming amplifiers to the circuit.

A somewhat better method of solving the problem is to use a multiphase clock supply. A multiphase clock supply is a device that generates a multiplicity of clocking pulses sequentially distributed in time and space. The distribution of the clocking pulses is preselected so that the sequence of application to various portions of the circuitry corresponds to the rate of flow of information.

A multiphase clock supply may be conceived in many different physical embodiments. A particularly simple way of constructing such a clock supply is to use a tapped delay line. A voltage clocking pulse applied to the input of such a delay line is sequentially distributed to each of the tapped outputs at time intervals correpsonding to the electrical distance between the taps. Such a multiphase clock supply is desirable because of its simplicity of construction. However, it would not be suitable for a system requiring a large number of phases in the clock supply because of attenuation of the clock pulse in the delay line.

A more feasible method of providing a multiphase clock supply, especially where a large number of phases is required, is to use a ring counter or a sequential distributor, such as a stepping switch. Multiphase clock supplies using counters or distributors are not limited in the number of phases by the problem of attenuation as are delay lines. However, in a situation where a series of clocking pulses of substantial power is required, each individual stage of the counter or distributor must be capable of individually supplying all the necessary power to the clocking pulse. Since each stage usually supplies only one clocking pulse in the sequence, that stage must necessarily remain idle at all times when it is out of sequence with the time distribution of clock pulses. Furthermore, should any stage malfunction, a particular phase of the clock supply would be disabled. The foregoing indicates that it would be desirable to construct a multiphase clock supply that would be reliable and would not be limited in the number of phases by attenuation nor limited in power output by the power capacity of individual stages.

It is therefore an object of the present invention to overcome the aforementioned difficulties.

Another object of this invention is to simplify the design and construction of multiphase clock supplies.

A more specific object of this invention is to improve reliability of multiphase clock supplies by controlling the selected clock pulse output with a plurality of input signals.

A still further object of this invention is to increase the power output of each phase of a multiphase clock supply by combining the total power of a plurality of input signals at a single output.

Yet another object of this invention is to increase the sensitivity of multiphase clock supplies to respond to input signals.

Yet another object of this invention is to allow the selection of a particular number of phased outputs from a multiplicity of possible design combinations.

In accordance with the present invention, a preselected pulse group is launched on a delay medium having a plurality of equispaced taps connected to the input windings of a load-sharing matrix switch. A feedback loop applies the serial output of the delay medium to its input, causing the pulse group to be periodically recirculated. A cyclically permuted group of pulse words therefore appears at the taps. That is, each successive word so appearing is formed by tranposing what was the last digit of the word to the first position by way of the feedback loop.

A load-sharing matrix switch is an energy-translating device designed to enable each of a plurality of simultaneously applied input signals to contribute actively to a single output signal on a single selected output lead.

The initially launched pulse group is chosen so that the cyclic permutations generated at the taps of the delay medium during the recirculation process will each energize a different output lead of the matrix switch. Thus, as the group of pulses is cyclically permuted by way of the feedback loop, the output of the matrix switch is stepped from lead to lead, providing a multiphase clock supply source in accordance with aforementioned objects.

In order to implement the above combination, the binary representation of the rectangular array of intersection coupling senses of input leads and output devices corresponds to the incidence matrix of a cyclic block design. The pulse group for energizing the matrix switch is so chosen that, when reduced to a binary representation each cyclic permutation of the group corresponds to a different row of the incidence matrix of the cyclic block design.

In order to facilitate understanding of the invention, it is desirable that the term "cyclic block design" be defined as to its meaning within the context of the invention. Therefore, before presenting the description of a specific embodiment of the invention, a brief explanation of the meaning and synthesis of cyclic block designs will be presented.

A cyclic block design can be represented by an incidence matrix of ones and zeros which is generated by the cyclic permutation of a binary code word. The code word pattern is generated by a difference set. A difference set $(v, k, \lambda)$ is a set of $k$ integers $d_0$, $d_1$, $d_2 \ldots d_{k-1}$ (mod $v$) such that among the differences $d_\alpha - d_\beta$ (mod $v$), each difference occurs $\lambda$ times. The integers of the difference set determine the digit positions of the ones in the code word; the remaining positions comprising zeros. The first digit position corresponds to the integer zero, the second to one, the third to two, and so on. For instance, the difference set 0, 1, 2, 4, (mod 7) would correspond to the code word 1110100, the modulus representing the number of digit positions available. Note that each translate of a difference set, i.e., $d_0+i$, $d_1+i \ldots d_{k-1}+i$ (mod $v$) is also a difference set with the same $v, k, \lambda$.

The incidence matrix of the cyclic block design is then formed by the contiguous cyclic permutations of the code word, i.e., the right-hand digit is removed from the word with each of the remaining digits being shifted one digit position to the right. The former right-hand digit is then placed at the extreme left-hand digit position of the code word. When the number of cyclic permutations is $v$, the incidence matrix of the cyclic block design has been formed. Each cyclic block design $(v, k, \lambda)$ thus corresponds to a set of $v$ difference sets $(v, k, \lambda)$. The incidence matrix of the cyclic block design for the code word 1110100 is:

$$\begin{bmatrix} 1&1&1&0&1&0&0 \\ 0&1&1&1&0&1&0 \\ 0&0&1&1&1&0&1 \\ 1&0&0&1&1&1&0 \\ 0&1&0&0&1&1&1 \\ 1&0&1&0&0&1&1 \\ 1&1&0&1&0&0&1 \end{bmatrix}$$

Difference sets have received considerable attention in the literature. These sets exist in a large variety of configurations of $(v, k, \lambda)$. However, to achieve good load-sharing efficiency, the following conditions are desirable in designing a load-sharing matrix switch:

(A) The inequality of $1<k<v-1$ should be adhered to.

(B) The modulus of the difference set may be a number $(4t-1)$ congruent to 3 modulo 4, i.e., 3, 7, 11, 15, 19, 23, 31, 35, 43, 47, 59, 63, 67, et cetera, for which the load-sharing efficiency is a maximum if $k=2t$, $\lambda=t$ or $k=2t-1$, $\lambda=t-1$.

(C) In addition, several other numbers generate suitable cyclic block designs such as 13, 31, 37 and 40, whose solutions will be discussed later.

Two numbers are congruent to each other modulo $v$ if, when they are divided by $v$, they both leave the same remainder. Symbolically this is expressed as $a \equiv b \pmod{v}$. The quadratic residues $a$ of a number $v$ are those numbers congruent to the squares of the numbers 1, 2 . . . $(v-1)$, and are expressed as $a \equiv x^2 \pmod{v}$ (where $x \equiv 1, 2, 3 \ldots v-1$). Similarly, a biquadratic residue $b$ is defined by $b \equiv x^4 \pmod{v}$.

Many difference sets useful in devising load-sharing matrix switches are derived from the quadratic residues of prime numbers which are congruent to 3 (mod 4), and have $v=4t-1$, $k=2t$, $\lambda=t$, $t=1, 2, 3 \ldots$. The code word corresponding to the difference set is of the form $U_0, U_1, U_2 \ldots U_{4t-2}=U_{v-1}$, where $U_\alpha=1$ if $\alpha$ is a quadratic residue (mod $v$), and $U_\alpha=0$ if $\alpha$ is a quadratic nonresidue (mod $v$), and $U_0=1$.

Marshall Hall, in the Proceedings of the American Mathematical Society, vol. 7, pages 925–986, 1956, lists or provides a solution for all the difference sets having $3 \leqslant k \leqslant 50$ and $k<v/2$. This, of course, includes cases of the quadratic residues of primes congruent to 3 (mod 4). A partial listing of code words corresponding as above to the quadratic residues (and zero) of the primes 3, 7, 11, 19, 23, 31, 43, 47, and 59 are, respectively, 110
1110100
11011100010
1100111101010000110
11111010110011001010000
1110110111100010101110000100100
1100101001110111110001011100000100011010110
11111011110010101110010110110001010110000100000 and

11011101010010011101111001111100000110000100011011010100010

A complete tabulation of the quadratic residues of prime numbers up to 1021 is contained in a Lincoln Laboratories Report (Massachusetts Institute of Technology, Lexington, Massachusetts) by R. M. Lerner and A. M. Sherman (Astia Number AD–241464).

Another class of difference sets of the type $(4t-1, 2t, t)$ is that derived from primitive irreducible polynominals of degree $r$, modulus 2, for which $4t-1=v=2^r-1$. The applicant, in an article entitled "A Note on Cyclic Permutation Error-Correcting Codes" in Information and Control, vol. 5, pages 72–86, March 1962, discusses various cyclic permutation codes and their derivation, including a discussion of irreducible polynominals. The first case differing from those derived above occurs for $v=31$, for which the code word is

1111101110001010110100001100100

Yet another set of difference sets of the form $(4t-1, 2t, t)$ arise when $v$ is the product of so-called twin primes. Twin primes are prime numbers of the form $pq$, where $q=p+2$. The first two significant twin-prime cases lead to $v=3\times5=15$ and $v=5\times7=35$, whose code words are, respectively,

11101011001000 and

11111000111010010011010100001001110

A comprehensive discussion of these twin-prime difference sets is given by A. Brauer in "On a New Class of Hadamard Matrices," Math. Zeitschrift, vol. 58, pages 219–225, 1953.

Several other types of difference sets described by Hall are also applicable. As an example, for $v=13$, 37, and 40, there are the code words

1101000001000

(which is an example of biquadratic residues and zero for primes on the form $v=4x^2+9$, $k=x^2+3$, $\lambda=(x^2+3)/4$, where $x$ is odd),

1100000101101000100000000001000000001100

(which is an example of biquadratic residues and zero of the form $v=4x^2+1$, $k=x^2$, $\lambda=(x^2-1)/4$, where $x$ is odd), and

1000100110111100110101111010111111101111 respectively.

An $m$ by $n$ matrix switch is a logical network whose configuration is a rectangular array of $n$ input and $m$ output leads. Given one of $m$ different sets of $n$ inputs $X_l=(x_{l1} \ldots x_{ln})$ for $l=1 \ldots m$, the matrix switch produces a corresponding set of $m$ outputs $$Y=\begin{bmatrix} y_{1l} \\ \vdots \\ y_{ml} \end{bmatrix} \text{ for } l=1 \ldots, m$$

An $m$ by $n$ matrix switch is defined by its $m$ by $n$ winding matrix $W=[w_{ij}]$, wherein the magnitude of $w_{ij}$ represents the number of windings of the $j$th input wire on the $i$th output device and the sign of $w_{ij}$ represents the direction of the winding. The output of the matrix switch resulting from the $l$th set of inputs is assumed to be representable by $$y_{il}=\sum_{j=1}^{n} W_{ij} x_{lj}$$

that is, the output matrix Y is the product of the winding matrix W and the transpose $X^T$ of the input matrix X.

The array of contiguous cyclic permutations of each of the foregoing code words yields the incidence matrix of a cyclic block design, which is the basis of a winding matrix for a load-sharing matrix switch design. The winding matrix is defined by the equation $w_{ij}=2a_{ij}-1$, i.e. $i$ designates the row of the number and $j$ designates the column. From this equation, it is seen that $w_{ij}=+1$ if $a_{ij}=1$ and $w_{ij}=-1$ if $a_{ij}=0$. The winding matrix for the code word 1110100 is therefore:

$$\begin{bmatrix} 1&1&1&-1&1&-1&-1 \\ -1&1&1&1&-1&1&-1 \\ -1&-1&1&1&1&-1&1 \\ 1&-1&-1&1&1&1&-1 \\ -1&1&-1&-1&1&1&1 \\ 1&-1&1&-1&-1&1&1 \\ 1&1&-1&1&-1&-1&1 \end{bmatrix}$$

The winding matrix, thus defined, is suitable for designing matrix switches for both unipolar and bipolar inputs. If the $l$th set of inputs is of the form $x_{lj}=a_{lj}$, $j=1 \ldots v$, i.e., unipolar, then the selected output (the output $y_{ll}$ to which all input drives actively contribute) is $y_{ll}=k$. The unselected outputs (limited to noise caused by failure of opposing fluxes to cancel in all other than the selected output) are defined by $y_{il}=2\lambda-k$, for $i\neq l$. That is, the selected output for the $l$th set of inputs occurs on row $l$ and the unselected outputs will occur on all other rows. If $2\lambda-k=0$, then the load-sharing matrix switch has the unselected outputs zero, and is said to be noiseless. If a particular switch design has noise, an additional driving column is added to the cores to cancel out the unselected outputs. For the code word 1110100, where $v=7$, $k=4$, and $\lambda=2$, the selected output is $k=4$ and the unselected outputs are $$2\lambda-k=2\cdot2-4=0$$

i.e., the switch is noiseless.

If the $l$th set of inputs of the form $x_{lj}=2a_{lj}-1$, $j=1 \ldots v$, i.e., bipolar, then the selected output is $y_{lj}=v$ and the unselected outputs are $y_{il}=v-4k+4\lambda$, for $i\neq l$. The selected and unselected outputs for the above block design are found to be 7 and $-1$, respectively. Since the switch is not noiseless, an additional input winding must be added to cancel out the unselected outputs. The driving column has the value of $w_{i8}=1$ for $i=1, 2, \ldots 8$. This additional input winding increases the selected output to 8 and cancels the remaining unselected outputs.

The applicant, in an article entitled, "On the Logical Design of Noiseless Load-Sharing Matrix Switches," in the IRE Transaction on Electronic Computers, vol. 11, No. 3, pages 369–374, June 1962, discloses a general theory for designing noiseless load-sharing matrix switches, given any incidence matrix of a block design, to which the reader is referred for a more extensive treatment. Sets of windings more complicated than those defined by $W_{lj}=2a_{lj}-1$ are also considered in this article.

In the attainment of the aforementioned objects, an important feature of this invention resides in the application of a load-sharing matrix switch as a means to translate a given group of input signals into a clock output pulse of a particular phase, the particular phase being determined by certain group combinations of the input signals.

The foregoing feature of this invention confers the advantage of enabling the clock supply to switch the input power into a single output channel with minimal power loss therein.

An additional advantage is that the failure of one of the input windings will not disable or disrupt the clock supply output, because each phase of this output is controlled by a plurality of input windings.

Additional objects and advantages will become readily apparent by reference to the following drawings and description of specific embodiments of the invention, and also to the appended claims in which the features and novelty of the invention are more particularly pointed out.

In accordance with the foregoing, the following drawings illustrate a specific embodiment of the invention wherein:

FIG. 1 shows a schematic circuit diagram of an illustrative example of a clock supply using a noiseless load-sharing multiple-coil relay matrix switch with a unipolar drive;

FIG. 2 shows a schematic circuit diagram of an illustrative example of a clock supply using a noiseless load-sharing multiple-coil relay matrix switch with a bipolar drive.

Figure 3:
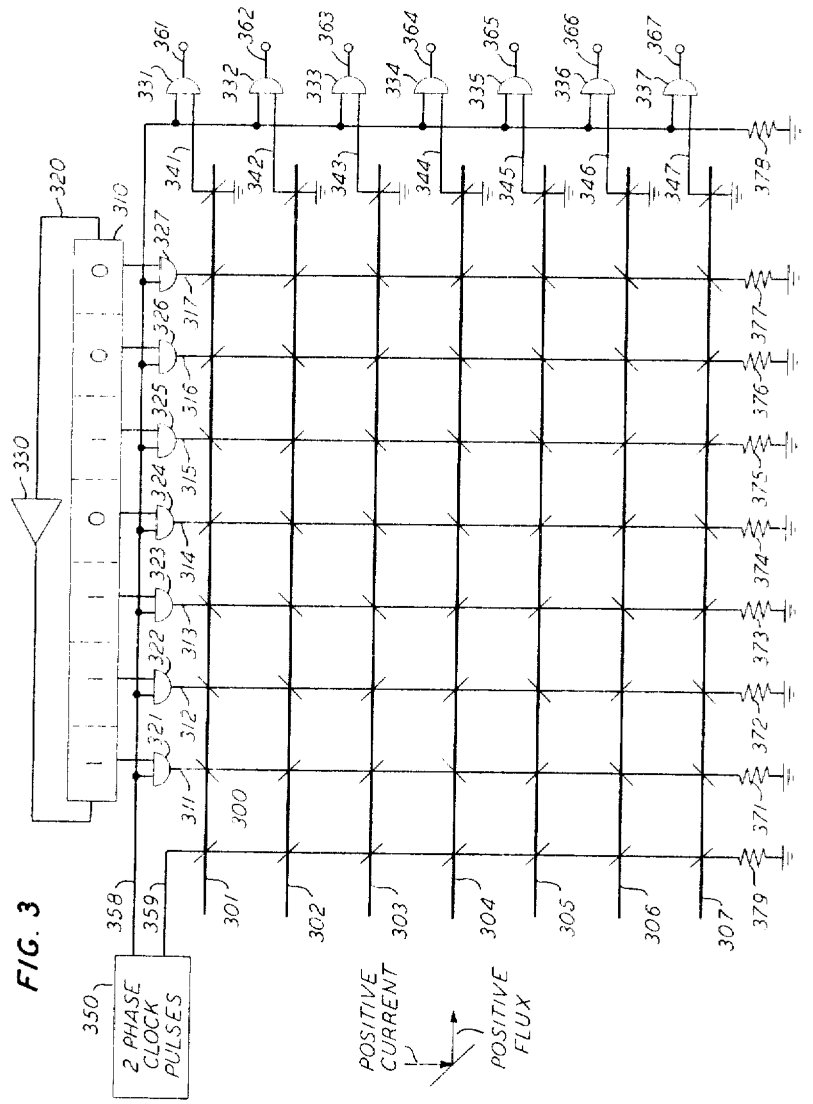
FIG. 3 shows a schematic circuit diagram of an illustrative example of a clock supply using a noiseless load-sharing matrix switch comprising magnetic cores with a unipolar drive.

Referring now to FIG. 1, there is shown one illustrative embodiment of a multiphase clock supply comprising the seven relay cores, 101 to 107. These cores are preferably of a material that exhibits a low retentivity. Each of the relay cores, 101 to 107, has wound upon it a number of separate input windings, 111 to 117. The senses of the couplings of the input windings to the cores are such that the binary representation of the array of input winding orientations corresponds to the incidence matrix of a cyclic block design.

The input winding 111, for example, is coupled to the relay cores 102, 103 and 105 in such a manner that a positive energizing current (positive directions are indicated on FIG. 1) will induce a positive flux in these relay cores. The same energizing current will induce a negative flux in the relay cores 101, 104, 106 and 107. The input winding 112 is coupled such that a positive energizing current will induce a positive flux in relay cores 103, 104, and 106 and a negative flux in the relay cores 101, 102, 105, and 107. A positive current in the input winding 113 will induce a positive flux in relay cores 101, 102, 103, and 106, and a negative flux in the cores 104, 105, and 107. A positive current in the input winding 114 will induce a positive flux in the relay cores 101, 105, and 106, and a negative flux in the cores 102, 103, 104, and 107. Similarly, a positive current in the input windings 115, 116, and 117 will induce positive fluxes in the relay cores 102, 106, 107; cores 101, 103, 107; and cores 101, 102, 104, respectively, and negative fluxes in the balance of the cores.

The coupling senses of all of the input windings are such that a particular pattern of electrical pulses applied to the input windings will produce a plurality of fluxes all in the same direction in one of the relay cores. This particular pattern corresponds to the binary representation of the pattern which schematically represents the coupling sense of the input windings coupled to that core. Any other permutation of this pulse pattern will cause self-canceling fluxes to be instituted within the core i.e., half the flux will be generated in a positive direction and the other half in a negative direction.

Each of the relay cores, 101, to 107, controls a relay contact, 121 to 127. Each relay contact is biased to respond only to a certain energy level in any of the energized relay cores. Such bias may be by spring, gravity, magnetic or any other suitable means known in the art. The biasing normally retains the relay contacts, 121 to 127, in contact with the support contacts, 141 to 147, respectively, which may or may not be connected with external circuitry. This bias is sufficient to retain the relay contact in this position until the relay coil is energized with a sufficient flux. The level of energy is generally chosen to correspond to the flux induced by the input on three input windings. This is to insure continued operation should one of the input windings be damaged. One of the energized relay contacts, 121 to 127, makes contact with one of the circuit enabling contacts, 131 to 137, whose function is to complete some necessary circuit connection.

The parallel equispaced output taps of a recirculating delay medium 110 are applied to the relay coil input windings 111 to 117. This delay medium is preferably a lumped-parameter type delay line implemented with a series of cascaded networks, but may also comprise a shift register or some suitable equivalent. The serial output of the delay medium 110 is applied, by feedback loop 120, to its serial input. A regenerative amplifier 130, such as a blocking oscillator, is included in the feedback loop to compensate for the attenuation of the stored pulse groups in traversing the delay line.

Resistors 171 to 177 connect the termination of the input windings to ground and serve to limit the value of the input winding currents.

The circuit herein described operates as follows: The pulse group in the delay medium is continuously permuted by reason of the feedback loop 120 which applies the serial output of the line to its serial input. The regenerative amplifier 130 compensates for attenuation of voltage pulses as they are propagated through the delay line.

The parallel outputs of the delay line 110 are applied to the input windings 111 to 117. These outputs, depending on the pulse grouping, selectively apply energy to four of the input windings. The effect of the particular pulse grouping shown in the delay line in FIG. 1 would be to energize the input windings 111, 113, and 115. No energy is applied to the input windings 114, 116, and 117, since no energy is stored in these respective positions in the delay medium, and hence the input windings 114, 116, and 117 are not energized.

The energizing current, which is applied to the coil windings 111, 112, 113, and 115, will induce a negative flux of four units in the relay core 101. This may be verified by inspection, since the energized input windings coupled to core 101 are all wound in the same direction.

The energized windings on relay cores 102 to 107 are oriented so that the energizing currents will create fluxes that will oppose and nullify each other. Therefore these cores are not sufficiently energized by flux to close the relay contact.

The pulse energy stored in the delay medium is continuously permuted. For example, no pulse is contained prior to shifting at the electrical termination of the delay medium as shown in FIG. 1. The pulse contained at the initial stage of the delay medium is permuted one stage toward the termination of it and, in its place, as if recirculated from the termination of the delay medium, no pulse is applied to the initial stage of the delay medium.

The energizing pulses stored in the delay medium 110 after the permutation will subsequently energize the input windings 112, 113, 114, and 116. Inspection of the orientation of the couplings of these input windings to the cores indicates that core 102 will be energized and cores 101, 103, 104, 105, 106, and 107 will remain unenergized.

The sequence of cores energized by the subsequent permutation of the delay line will conform to a cyclic pattern. This cyclic sequence of flux energy within the cores will produce a cyclic sequential distribution of clocking pulses, due to the sequential enabling of the relay contacts 121 to 127 to connect with the circuit enabling contacts 131 to 137.

Each core is wound so that one particular permutation pattern of the recirculating energy pulses, applied to the corresponding coil windings of that selected core, will generate four fluxes in one direction. Any other permutation of that pattern will create two fluxes in one direction and two in the other. Should one input winding be accidentally disconnected, or in any other way fail, the energy applied to the selected core will generate three units of flux in one direction. The energizing applied to the other unselected cores will generate two units of flux in one direction and one unit of flux in the other. This will leave a net flux of one unit in the unselected core, which is not sufficient to energize the relay contact adjacent to that relay core. Hence failure of any input winding will not incapacitate the clock supply.

A second illustrative embodiment of the invention is shown in FIG. 2 with a bipolar drive instead of the unipolar drive shown in FIG. 1. This embodiment, while also supplying a seven-phase clock output, has the advantage of greater output power for the same given number of input windings. All of the input windings are simultaneously energized. This allows all of the input windings to contribute simultaneously equally to the energizing flux.

The bipolar seven-phase clock is constructed and operated in the same manner as is the unipolar seven-phase clock. The application of energizing pulses to all the input windings allows the power applied to each individual input winding to be considerably less than the value needed for the unipolar drive. An energizing pulse of an additional noncirculating signal source is applied to an additional input winding to make the action of the clock noiseless.

As in the unipolar drive, the energizing pulses contained within the delay line 210 are continuously cyclically permuted by recirculation. The application of the energizing pulses contained in the delay line 210, as illustrated, to the coil windings 211 to 217 will energize the relay core 201. The remaining cores 202 to 207 will remain unenergized, as the coil windings are energized in such a direction that a group of opposing fluxes are created. A negative pulse signal is applied by the signal source 219 to the input winding 218. This signal cancels the resultant flux signal in the cores 202 to 207 and adds to the resultant flux in core 201. Cyclic permutation of the energy pulses in the delay line energize respectively relay cores 202 to 207 in a cyclic sequential order.

Since every driving winding is fully energized during every cycle of operation, a much greater power output for each individual input winding is obtained on the selected cores than is available in the unipolar drive. An analysis of this matrix switch will show that should one of the input windings fail the clock will still continue to function in a manner similar to that described with respect to FIG. 1.

The multiple-coil relay load-sharing matrix switch is advantageous where a clocking output of a continuous nature is desired for the entire duration of each individual clocking phase. The outstanding feature of the multiple-coil relay load-sharing matrix switch is its simplicity of construction and operation.

Where a sharp trigger type clocking output and relatively high speeds are desired, a more suitable embodiment of the invention utilizes a magnetic core load-sharing matrix switch. Such a switch is schematically illustrated in FIG. 3. A multiphase clock supply comprising seven magnetic cores, 301 to 307, is shown. These cores are preferably of a type which exhibit a very nearly rectangular hysteresis loop characteristic. Such a core can be switched to either one of two residual states of magnetization and remain in that state without the consumption of any energizing electromotive force.

Each of the magnetic cores 301 to 307 has wound upon it a number of separate driving windings 311 to 317 and a restoring winding 359. The senses of the couplings of the driving windings and the cores are indicated by diagonal lines, such as line 300. These diagonal lines are in the "mirror symbol" notation. For a comprehensive explanation of this notation, the reader is referred to United States Patent No. 2,930,903, by F. T. Andrews, issued March 29, 1960. It is noted that the binary representation of the array of coupling orientations at the interconnections of the driving windings 311 to 317 and the cores 301 to 307 correspond to the incidence matrix of the cyclic block design pattern hereinbefore defined.

The driving winding 311, for example, is coupled to cores 302, 303 and 305 in such a manner that a positive driving current (positive directions are indicated on FIG. 3) will induce a positive flux in these cores. This same driving current will induce a negative flux in cores 301, 304, 306, and 307. Driving winding 312 is coupled such that a positive driving current will induce a negative flux in cores 301, 302, 305, and 307, and a positive flux in cores 303, 304, and 306. A positive current in driving winding 313 will induce a negative flux in cores 301, 302, 303, and 306, and a positive flux in cores 304, 305, and 307. A positive driving current in driving the coil winding 314 will induce negative flux in cores 302, 303, 304, and 307, and a positive flux in cores 301, 305, and 306. Similarly, a positive driving current in driving winding 315, 316, and 317 will induce negative fluxes in cores 301, 303, 304, 205, and 302; 304, 305, and 306; and 303, 305, 306, 307, respectively, and positive fluxes in the balance of the interconnections.

The coupling senses of all of the driving windings, and of any one of the cores, as in the case of the multiple coil relays, is such that a particular pattern of energy pulses applied to the driving windings will produce a plurality of fluxes all in the same direction. This particular pattern is that pattern which corresponds to the binary representation of the pattern which schematically represents the coupling senses of the driving windings coupled to that core. Any other permutation of this driving pattern will cause self-canceling fluxes to be instituted within the core; i.e., half the flux will be generated in a positive direction and the other half in a negative direction.

A two-phase pulse source 350 is provided to supply pulses in alternate phases. One of the two phases is applied to the restoring winding 359 and is of sufficient power to switch any one of the magnetic cores to a negative state of magnetic saturation. The alternate phase pulse is applied to the enabling inputs of AND gates 321 to 327, and 331 to 337.

The parallel, equispaced output taps of a recirculating delay medium 310 are applied to the AND gates 321 to 327. This delay medium is preferably a shift register or some suitable equivalent, but may also comprise a lumped-parameter type delay line with a series of cascaded networks. The serial output of the delay medium is applied by feedback loop 320 to its serial input. A regenerative amplifier 330 such as a monostable multivibrator is included in the feedback loop to compensate for the attenuation of the stored pulse groups in traversing the delay line.

The outputs of AND gates 321 to 327 are applied to the driving windings 311 to 317, respectively.

Each of the magnetic cores 301 to 307 has coupled thereto one of the output windings 341 to 347. The output windings are applied to the AND gates 331 to 337, respectively, and serve to supply a timing pulse at a particular one of the AND gates. These AND gates are enabled to transmit pulses by the two-phase pulse source 350, one phase of which is applied to the AND gates by lead 358. Clocking pulses occur only during brief portions of each cycle of source 350.

Resistors 371 to 377 connect the driving windings to ground and serve to limit the value of the driving currents. Resistors 378 and 379 connect the alternating phase pulse outputs of the two-phase pulse source 350 to ground and serve the same purpose.

The circuit herein described operates as follows: The two-phase pulse source is adjusted so that its frequency corresponds to the frequency of permutation of the group of energy pulses contained within the delay line 310. That is, the period of each cycle is made equal to the delay between successive taps on delay medium 310.

The two-phase output of the pulse source 350 is applied respectively to the restoring winding 359 and through lead 358 to the AND gates 321 to 327 and AND gates 331 to 337. The pulse group in the delay medium is continuously permuted by reason of the feedback loop 320 which applies the serial output of the line to its serial input. A regenerative amplifier 330, in the feedback loop, compensates for the attenuation of the pulses as they are propagated through the delay medium.

Every alternate phase of the two-phase pulse source 350 energizes the restoring winding 359. This energy is sufficient to reset one of the magnetic cores to a negative residual state of magnetism.

The parallel outputs of the delay medium 310 are applied to the AND gates 321 to 327. These outputs selectively energize four of the AND gates 321 to 327, enabled by the two-phase pulse source 350, and apply the driving power to the proper driving windings. The effect of the particular pulse grouping shown in the delay medium in FIG. 3 would be to energize the AND gates 321, 322, 323, and 325. This allows the delay medium 310 to apply driving pulses through the AND gates to the driving windings 311, 312, 313, and 315 of the matrix switch. No energy is applied to the driving windings 314, 316, and 317, since no energy is stored in these respective positions in the delay medium, and hence AND gates 324, 325 and 327 are not fully energized.

The driving power which is applied to the driving windings 311, 312, 313, and 315 switches the magnetic core 301 to a positive state of magnetic saturation. This may be verified by inspection. Since the energized driving windings connected to core 301 are all wound in the same direction, this creates a composite driving current sufficient to drive the core to a positive state of magnetic saturation. The switching threshold of the core is preferably located at a level such that at least three of these driving windings must produce an unoppose flux in a common direction to switch the magnetic state of the core.

The energized windings on cores 302 to 307 are oriented so that two of the applied driving currents will create a flux that will oppose the flux created by the other two driving currents. Therefore these cores are not switched to a positive state of magnetic saturation, but remain in their negative state of magnetic saturation.

The change of state of flux in core 301 causes a signal to be generated in the output winding 341. This signal is transmitted by the AND gate 331, which is enabled by a pulse from the two-phase pulse source 350. A pulse is therefore applied to the multiphase clock supply terminal 361. Since the cores 302 to 307 do not change in magnetic state, no output signal will be generated in the output windings 342 to 347.

The application of the alternate phase pulse by the restoring winding 359 will thereafter reset core 301 to its negative residual state of magnetization. Cores 302 to 307, already being in a negative residual state of magnetization, will remain unchanged.

In the time interval of the alternate phase of the two-phase pulse source, sufficient time elapses to allow the stored pulse group in the delay medium 310 to be permuted by one pulse length. This shifting occurs in the same manner as in the delay medium used in the multiple coil relay embodiments of FIGS. 1 and 2.

The pulse energy stored in the delay medium 310 after the permutation will subsequently fully energize AND gates 322, 323, 324 and 326 which have been partially enabled by the opposite phase pulse from the two-phase pulse source 350. This will allow the application of the pulse energy in the delay medium 310 to the driving windings 312, 313, 314, and 316. Inspection of the orientation of the core windings indicates that core 302 will be switched to its positive state of magnetic saturation and that cores 301, 303, 304, 305, 306, and 307 will remain unchanged.

As the two-phase pulse source 350 alternates, the sequence of cores switched to a positive state of magnetic saturation by the subsequent permutation of the delay medium will conform to a cyclic pattern. This cyclic sequence of flux changes within the cores will produce a cyclic sequential distribution of clocking pulses at the clocking terminals 361 to 367.

It can be seen, from the foregoing, that each core is wound so that one particular permutation pattern of the recirculating energy pulses, applied to the corresponding driver windings of that selected core, will generate all fluxes in one direction and switch that core. Any other permutation of the pattern will create two units of flux in one direction and two in the other. Should one driving winding be accidentally disconnected, or in any other way fail, the windings applied to the selected core will still generate a sufficient unidirectional flux to switch that core.

It is to be understood that the above-described arrangements are merely illustrative of the numerous and various arrangements which may constitute an application of the present invention. Such arrangements, for instance, may utilize multiaperture magnetic devices, parametrons, cryrotrons, or thin films in the place of magnetic cores or multiple coil relays. Furthermore, a shift register may be used instead of a delay line to drive the matrix switch.

Such arrangements may readily be devised by those skilled in the art without departing from the spirit and scope of the invention. In addition, any technology may be used for the matrix switch where the matrix equation $Y=WX^T$ is a reasonable approximation.

What is claimed is:

1. In combination, means for storing an ordered array of electrical binary impulses, the binary representation of said ordered array of electrical impulses corresponding to the binary representation of a difference set, means to successively and cyclically permute said ordered array, translating means responsive to successive cyclic permutations of said electrical impulses to produce successive time-phased output signals, said translating means comprising an array of input windings coupled to a plurality of flux responsive devices, the binary representation of the coupling senses of the windings coupled to said flux responsive devices corresponding to a cyclic block design, said cyclic block design being derived from said difference set, and means for respectively applying the ordered array of electrical impulses and the permutations thereof to said array of input windings whereby the locus of each time-phased output signal is determined by the cyclic permutation of said electrical impulses.

2. The combination set forth in claim 1, wherein said difference set is derived from quadratic residues of prime numbers congruent to three modulo four.

3. The combination set forth in claim 1, wherein said difference set is derived from irreducible modulo two polynominals.

4. The combination set forth in claim 1, wherein said difference set is derived from the quadratic residues of twin prime numbers.

5. The combination set forth in claim 1, wherein said difference set is derived from the biquadratic residues of prime numbers of the form $P=4x^2+9$, $x$ being odd.

6. The combination set forth in claim 1, wherein said difference set is derived from the biquadratic residues of prime numbers of the form $P=4x^2+1$, $x$ being odd.

7. The combination as set forth in claim 1 wherein said ordered array of binary impulses comprises an array of bipolar pulses.

8. The combination as set forth in claim 1 wherein the electrical impulse storage means comprises a delay line connected end to end in a loop configuration, said cyclic permutation resulting from the traversal of the electrical impulses in said delay line.

9. In combination, a storage medium having a given number of storage positions, means for cyclically permuting a preselected pattern of binary signals through said medium, the binary representation of said preselected pattern corresponding to the binary representation of a difference set, a plurality of signal combining means equal in number to said given number, each of said signal combining means including a plurality of input means and a single output means, the interconnection of said input means with each signal combining means being additive and subtractive in a pattern corresponding to a different cyclic permutation of said preselected pattern, and means for successively applying the binary signals in said medium to respective input means.

10. The combination set forth in claim 9, wherein the binary representation of said preselected pattern corresponds to a difference set.

11. The combination set forth in claim 10, wherein said difference set is derived from the quadratic residues of prime numbers congruent to three modulo four.

12. The combination set forth in claim 10, wherein said difference set is derived from irreducible modulo two polynominals.

13. The combination set forth in claim 10, wherein said difference set is derived from the quadratic residues of twin prime numbers.

14. The combination set forth in claim 10, wherein said difference set is derived from the biquadratic residues of prime numbers of the form $P=4x^2+1$, wherein $x$ is an odd number.

15. The combination set forth in claim 10, wherein said difference set is derived from the quadratic residues of twin prime numbers.

References Cited by the Examiner

UNITED STATES PATENTS 2,920,317 1/1960 Mallery ------------ 340—174

ROBERT C. BAILEY, *Primary Examiner.*

G. D. SHAW, *Assistant Examiner.*